US006734262B2

(12) United States Patent
Patel

(10) Patent No.: US 6,734,262 B2
(45) Date of Patent: *May 11, 2004

(54) METHODS OF FORMING CONDUCTIVE THERMOPLASTIC POLYETHERIMIDE POLYESTER COMPOSITIONS AND ARTICLES FORMED THEREBY

(75) Inventor: Niraj C. Patel, Norwalk, CT (US)

(73) Assignee: General Electric Company, Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/683,487

(22) Filed: Jan. 7, 2002

(65) Prior Publication Data

US 2004/0039096 A1 Feb. 26, 2004

(51) Int. Cl.[7] .............................. C08I 77/00; C08K 3/04; C08L 67/00
(52) U.S. Cl. ....................... 525/419; 525/420; 525/422; 525/432; 525/434; 525/436; 252/500; 252/502; 252/510; 252/511; 524/439; 524/440; 524/495; 264/614; 264/641; 106/472
(58) Field of Search ................................. 525/419–420, 525/422, 432, 434, 436; 524/439, 440; 252/500, 502, 510–511; 106/472; 264/614, 641

(56) References Cited

U.S. PATENT DOCUMENTS

| 2,465,319 | A | 3/1949 | Whinfield et al. ............. 260/75 |
| 3,047,539 | A | 7/1962 | Pengilly ..................... 260/75 |
| 3,847,867 | A | 11/1974 | Heath et al. ................... 260/47 |
| 3,850,885 | A | 11/1974 | Takekoshi et al. ............. 260/47 |
| 3,852,242 | A | 12/1974 | White ..................... 260/47 CZ |
| 3,855,178 | A | 12/1974 | White et al. ............. 260/45.7 S |
| 3,972,902 | A | 8/1976 | Heath et al. ............. 260/346.3 |
| 3,983,093 | A | 9/1976 | Williams, III et al. .. 260/47 CP |
| 4,141,927 | A | 2/1979 | White et al. ........... 260/857 PA |
| 4,443,591 | A | 4/1984 | Schmidt et al. ............. 528/128 |
| 4,455,410 | A | 6/1984 | Giles, Jr. ..................... 525/436 |
| 4,565,684 | A | 1/1986 | Tibbetts et al. .......... 423/447.3 |
| 4,572,813 | A | 2/1986 | Arakawa ..................... 264/29.2 |
| 4,663,230 | A | 5/1987 | Tennent ....................... 428/367 |
| 4,816,289 | A | 3/1989 | Komatsu et al. ......... 423/447.3 |
| 4,876,078 | A | 10/1989 | Arakawa et al. ......... 423/447.3 |
| 4,908,418 | A | 3/1990 | Holub ......................... 525/425 |
| 4,908,419 | A | 3/1990 | Holub et al. ................. 525/425 |
| 4,966,729 | A | 10/1990 | Carmona et al. ........... 252/511 |
| 5,024,818 | A | 6/1991 | Tibbetts et al. ............. 422/158 |
| 5,071,329 | A | 12/1991 | Sano et al. ................. 418/55.3 |
| 5,093,435 | A | 3/1992 | Harris et al. ................. 525/420 |
| 5,165,909 | A | 11/1992 | Tennent et al. ........... 423/447.3 |
| 5,284,903 | A | 2/1994 | Minnick ..................... 524/538 |
| 5,312,866 | A | 5/1994 | Tsutsumi et al. ........... 524/600 |
| 5,385,970 | A | 1/1995 | Gallucci et al. ............. 524/538 |
| 5,439,987 | A | 8/1995 | Scott et al. .................. 525/425 |
| 5,514,748 | A | 5/1996 | Isutsumi et al. ............ 524/600 |
| 5,516,837 | A | 5/1996 | Tsutsumi et al. ........... 524/600 |
| 5,543,474 | A | 8/1996 | Kawaki et al. .............. 525/440 |
| 5,571,875 | A | 11/1996 | Tsutsumi et al. ........... 525/425 |
| 5,589,152 | A | 12/1996 | Tennent et al. .......... 423/447.3 |
| 5,591,312 | A | 1/1997 | Smalley ................. 204/157.41 |
| 5,591,382 | A | 1/1997 | Nahass et al. ............... 252/511 |
| 5,591,832 | A | 1/1997 | Koshijima et al. .......... 530/500 |
| 5,641,455 | A | 6/1997 | Rosenlund et al. ........... 422/28 |
| 5,830,326 | A | 11/1998 | Iijima ......................... 204/173 |
| 5,866,647 | A | 2/1999 | Massey et al. .............. 524/494 |
| 5,919,429 | A | 7/1999 | Tanaka et al. .......... 423/445 B |
| 6,063,874 | A | 5/2000 | Jin et al. ..................... 525/390 |
| 6,111,031 | A | * | 8/2000 | Puyenbroek et al. ........ 525/422 |
| 6,149,840 | A | * | 11/2000 | Ardakani et al. ........... 252/500 |
| 6,149,848 | A | * | 11/2000 | Makise et al. ............. 264/105 |
| 6,150,473 | A | * | 11/2000 | Brown et al. ................ 525/423 |
| 6,183,714 | B1 | 2/2001 | Smalley et al. .......... 423/447.3 |
| 6,248,262 | B1 | * | 6/2001 | Kubotera et al. ........... 252/511 |
| 6,252,011 | B1 | 6/2001 | Scott .......................... 525/425 |
| 6,528,572 | B1 | * | 3/2003 | Patel et al. ................. 524/495 |
| 6,540,945 | B2 | * | 4/2003 | Kubotera et al. ........... 252/511 |

* cited by examiner

Primary Examiner—P. Hampton Hightower

(57) ABSTRACT

An electrically conductive thermoplastic composition with a superior ability to be heated rapidly in an electromagnetic field comprises a polyetherimide resin, a polyester resin, and electrically conductive filler. Such compositions display good dimensional stability at elevated temperatures especially when heated rapidly using electromagnetic radiation, which renders them useful in articles and operations where rapid assembly is important.

28 Claims, No Drawings

METHODS OF FORMING CONDUCTIVE THERMOPLASTIC POLYETHERIMIDE POLYESTER COMPOSITIONS AND ARTICLES FORMED THEREBY

BACKGROUND OF INVENTION

This Invention relates to methods for forming conductive thermoplastic polyetherimide polyester compositions and the articles formed thereby. Thermoplastic compositions comprising blends of polyetherimide resins and polyester resins are materials possessing thermal and dimensional stability particularly because the high flow temperatures of both materials permit them to be used in high temperature environments. The high flow temperatures however, cause manufacturing or assembly of articles made from these compositions to be cumbersome, expensive and time consuming because of the necessity of heating these materials to high temperatures and subsequently cooling them back to room temperature. It is therefore desirable to create thermoplastic compositions that in addition to being thermally and dimensionally stable are electrically conductive and can be rapidly heated to temperatures above the softening point of the compositions so that they can easily be assembled.

SUMMARY OF INVENTION

An electrically conductive thermoplastic composition with a superior ability to be heated rapidly in an electromagnetic field comprises a polyetherimide resin, a polyester resin, and electrically conductive filler. Such compositions display good dimensional stability at elevated temperatures, especially when heated rapidly using electromagnetic radiation, which renders them useful in articles and operations where rapid assembly is important.

DETAILED DESCRIPTION

It has been discovered that by blending thermoplastic resins such as polyetherimides, with polyester resins and an electrically conductive filler, it is possible to obtain moldable thermoplastic articles which possess unique properties such as low shrinkage, low coefficient of thermal expansion, electrical conductivity, increased elastic modulus and high impact-strength. In addition such compositions have good thermal and dimensional stability and can be heated efficiently and uniformly using electromagnetic energy such as microwave or radio frequency radiation. Uniform heating in the presence of an electromagnetic field is very useful in applications that require fast assembly, for example in inkjet pen cartridges and other items where different plastic parts are quickly heated in order to fuse them together during assembly.

Preferred polyetherimide resins comprise more than 1, typically about 10 to about 1000 or more, and more preferably about 10 to about 500 structural units, of the formula (I)

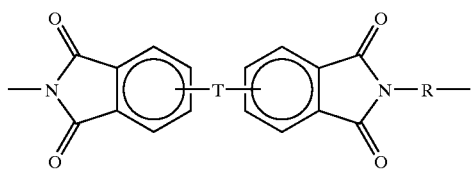

wherein T is —O— or a group of the formula —O—Z—O— wherein the divalent bonds of the —O— or the —O—Z—O— group are in the 3,3', 3,4', 4,3', or the 4,4' positions, and wherein T includes, but is not limited, to divalent radicals of formula (II) as defined below

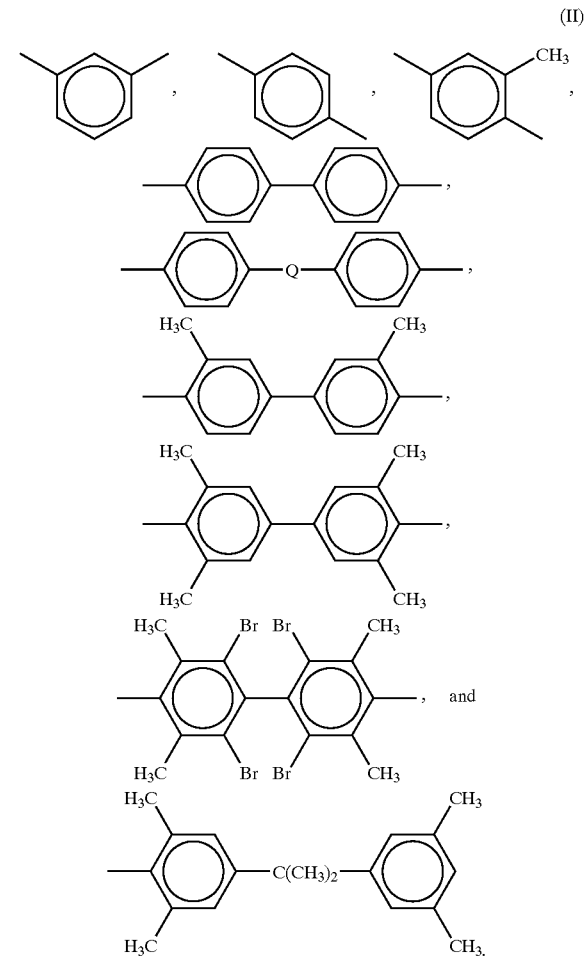

where Q in the above formula (II) may be divalent moiety selected from the group consisting of —O—, —S—, —C(O)—, —SO2—, —SO—, —CyH2y— (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4, positions, and wherein Z Includes, but is not limited, to divalent radicals of formula (II) above. R in formula (I) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (III)

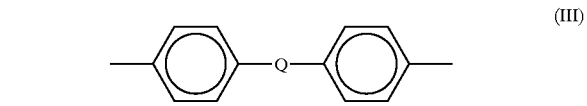

wherein Q is defined in formula (II) above.

In one embodiment, the polyetherimide may be a copolymer, which, in addition to the etherimide units described above, further contains polyimide structural units of the formula (IV)

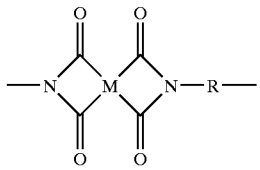

(IV)

wherein R is similar to that in formula (I) and includes but is not limited to substituted or unsubstituted divalent organic radicals such as, (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (V)

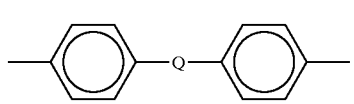

(V)

wherein Q includes but is not limited to a divalent moiety selected from the group consisting of —O—, —S—, —C(O)—, —SO$_2$—, —SO—, —C$_y$H$_{2y}$— (y being an integer from 1 to 5), and halogenated derivatives thereof, including perflfluoroalkylene groups. M includes, but is not limited to, radicals of formula (VI)

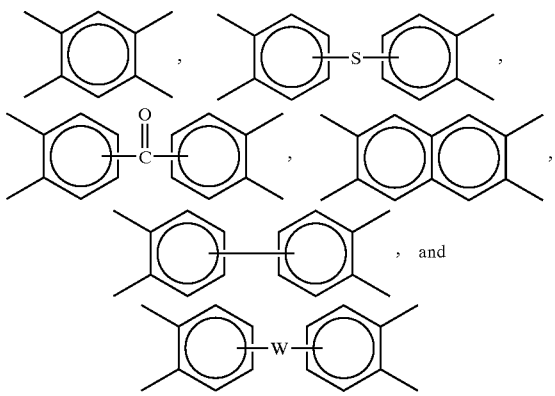

(VI)

wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof, including perflfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (II). Suitable substituents may be alkyl ethers, esters or amides, or aryl ethers, esters or amides, epoxides, alkyl groups or aryl groups, and the like.

The polyetherimide can be prepared by any of the methods well known to those skilled in the art, including the reaction of an aromatic bis(ether anhydride) of the formula (VII)

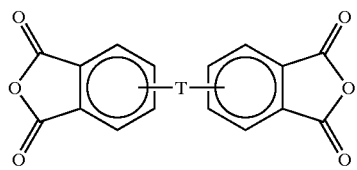

(VII)

with an organic diamine of the formula (VIII)

H2N—R—NH2 (VIII)

wherein T and R are defined as described above in formula (I).

Examples of specific aromatic bis(ether anhydride)s and organic diamines are disclosed, for example, in U.S. Pat. Nos. 3,972,902 and 4,455,410, which are incorporated herein by reference. Illustrative examples of aromatic bis (ether anhydride)s of formula (VII) include: 2,2-bis[4-(3,4-dicarboxyphenoxy)phenyl]propane dianhydride; 4,4'-bis(3, 4-dicarboxyphenoxy)diphenyl ether dianhydride; 4,4'-bis(3, 4-dicarboxyphenoxy)diphenyl sulfide dianhydride; 4,4'-bis (3,4-dicarboxyphenoxy)benzophenone dianhydride; 4,4'-bis (3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2, 3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride: 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by formula (VII) above includes, but is not limited to, compounds wherein T is of the formula (IX)

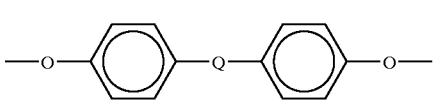

(IX)

and the ether linkages, for example, are preferably in the 3,3', 3,4', 4,3', or 4,4' positions, and mixtures thereof, and where Q is as defined above.

Any diamino compound may be employed as long as it does not interfere with the synthesis or use of the product. Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5- dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis (b-amino-t-butyl)toluene, bis(p-b-amino-t-butylphenyl) ether, bis(p-b-methyl-o-aminophenyl)benzene, bis(p-b-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis (3-aminopropyl)tetramethyidisiloxane. Mixtures of these compounds may also be present. The preferred diamino compounds are aromatic diamines, especially m- and p-phenylenediamine and mixtures thereof.

In a particularly preferred embodiment, the polyetherimide resin comprises structural units according to formula (I) wherein each R is independently p-phenylene or m-phenylene or a mixture thereof and T is a divalent radical of the formula (X).

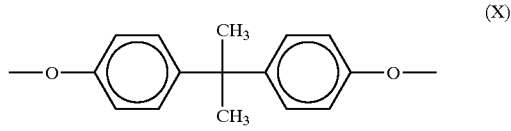

(X)

Included among the many methods of making the polyetherimides, are those disclosed in U.S. Pat. Nos. 3,847, 867, 3,850,885, 3,852,242, 3,855,178, 3,983,093, and 4,443, 591. These patents are incorporated herein by reference for the purpose of teaching, by way of illustration, general and specific methods for preparing polyetherimides.

In general, the reactions can be carried out employing well-known solvents, e.g., o-dichlorobenzene, m-cresol/toluene and the like, to effect a reaction between the anhydride of formula (VII) and the diamine of formula (VIII), at temperatures of about 100° C. to about 250° C. Alternatively, the polyetherimide can be prepared by melt polymerization of aromatic bis(ether anhydride)s (VII) and diamines (VIII) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide copolymers are employed, a dianhydride, such as pyromellitic anhydride, is used in combination with the bis(ether anhydride). The polyetherimide resins can optionally be prepared from reaction of an aromatic bis (ether anhydride) with an organic diamine in which the diamine is present in the reaction mixture at no more than about 0.2 molar excess, and preferably less than about 0.2 molar excess. Under such conditions the polyetherimide resin has less than about 15 microequivalents per gram ($\mu$eq/g) acid titratable groups, and preferably less than about 10 $\mu$eq/g acid titratable groups, as shown by titration with chloroform solution with a solution of 33 weight percent (wt %) hydrobromic acid in glacial acetic acid. Acid-titratable groups are essentially due to amine end-groups in the polyetherimide resin.

Generally, useful polyetherimides have a melt index of about 0.1 to about 10 grams per minute (g/min), as measured by American Society for Testing Materials (ASTM) D1238 at 295° C., using a 6.6 kilogram (kg) weight. In a preferred embodiment, the polyetherimide resin has a weight average molecular weight ($M_w$) of about 10,000 to about 150,000 grams per mole (g/mole), as measured by gel permeation chromatography, using a polystyrene standard. Such polyetherimide resins typically have an intrinsic viscosity greater than about 0.2 deciliters per gram (dl/g), preferably about 0.35 to about 0.7 dl/g measured in m-cresol at 25° C. Some such polyetherimides include, but are not limited to ULTEM® 1000 (number average molecular weight (Mn) 21,000; Mw 54,000; dispersity 2.5), ULTEM® 1010 (Mn 19,000; Mw 47,000; dispersity 2.5), ULTEM® 1040 (Mn 12,000; Mw 34,000–35,000; dispersity 2.9), all available from General Electric Plastics or mixtures thereof.

The polyetherimide may generally be present in amounts greater than or equal to 1, preferably greater than or equal to 5, more preferably greater than or equal to 10 wt % based on the total weight of the composition. It is also desirable for the polyetherimide to be present in an amount less than or equal to about 90, preferably less than or equal to about 80, more preferably less than or equal to about 60, most preferably less than or equal to 40 wt % based on the total weight of the composition.

Suitable polyesters for the conductive compositions include those derived from an aliphatic, cycloaliphatic, or aromatic diol, or mixtures thereof, containing from 2 to about 10 carbon atoms and at least one aliphatic, cycloaliphatic or aromatic dicarboxylic acid. Preferred polyesters are derived from an aliphatic diol and an aromatic dicarboxylic acid and have repeating units of the following general formula (XI):

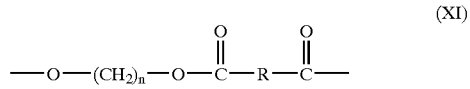

(XI)

wherein n is an integer of from 2 to 6, and R is a $C_6$–$C_{20}$ aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4' bisbenzoic acid, and mixtures thereof. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid, naphthalene dicarboxylic acid or a mixture thereof.

The diol may be a glycol, such as ethylene glycol, propylene glycol, trimethylene glycol, 2-methyl-1,3-propane glycol, hexamethylene glycol, decamethylene glycol, cyclohexane dimethanol, or neopentylene glycol; or a diol such as 1,4-butanediol, hydroquinone, or resorcinol. The most preferred polyesters are poly(ethylene terephthalate) (PED), poly(1,4-butylene terephthalate), ("PBT"), and poly(propylene terephthalate) ("PPT").

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539. Block copolyester resin components are also useful, and can be prepared by the transesterification of: (a) straight or branched chain poly(1,4-butylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. An exemplary block copolyester of this type is available commercially from General Electric Company, under the trade designation VALOX 330.

The polyester resins may generally be present in amounts greater than or equal to 1, preferably greater than or equal to 5, more preferably greater than or equal to 10, most preferably greater than or equal to 30 wt % based on the total weight of the composition. It is also desirable for the polyester resins to be present in an amount less than or equal to about 90 wt %, preferably less than or equal to about 85 wt %, more preferably less than or equal to about 80 wt % of the total composition.

The electrically conductive fillers added to the polyetherimide resin include but are not limited to conductive fillers such as carbon fibers, vapor grown carbon fibers, carbon nanotubes, carbon black, metallic powders, metallic fibers, metal coated fibers, and the like, that impart electrostatic dissipation (ESD) or antistatic properties to the composition.

Carbon fibers employed in the conductive compositions may be selected from conductive carbon fiber that is known for use in modifying the conductive properties of thermoplastic resins. Various types of conductive carbon fibers known in the art, and are classified according to their diameter, morphology, and degree of graphitization (morphology and degree of graphitization being interrelated). For example, carbon fibers having individual diameters greater than or equal to about 3 micrometers and less than or equal to about 10 micrometers, graphene ribbons parallel to the fiber axis (in radial, planar, or circumferential arrangements) and produced commercially by pyrolysis of organic precursors such as phenolics, polyacrylonitrile (PAN), or pitch may be used. The carbon fibers are generally chopped having an initial length (before compounding) from about 0.1 to about 2.0 inches. Unchopped carbon fibers may also be used. Fibers may be surface treated (e.g. oxidation) or coated with metals such as aluminum, copper, magnesium, chromium, tin, nickel, silver, iron, titanium, and mixtures comprising any one of the foregoing metals. Fibers may also be sized or unsized. Sized fibers are conventionally coated on at least a portion of their surfaces with a sizing composition (binder) selected for compatibility with the polyester and polyetherimides. The sizing composition facilitates wet-out and wet-through of the resins upon the fiber strands and assists attaining desired physical properties in the composite. Such fibers are sold under a variety of trade names, including but not limited to Fortafil CA and Fortafil CM available from Fortafil Fibers, Inc., Zoltek HT available from Zoltek Corporation, Toray available from Toray Industries Inc., and Grafil available from Mitsubishi.

Carbon fibers are generally used in amounts greater than or equal to about 2 wt %, preferably greater or equal to about 4 wt %, more preferably greater than or equal to about 6 wt % of the total composition. The carbon fibers are furthermore generally used in amounts less than or equal to about 40 wt %, preferably less than or equal to about 25 wt. more preferably less than or equal to about 20 wt % of the total weight of the composition.

Small graphitic or partially graphitic carbon fibers, also referred to as vapor grown carbon fibers (VGCF), having diameters of about 3.5 to about 500 nanometers (nm) and an aspect ratio greater than or equal to about 5 may be used.

When VGCF are used, diameters of about 3.5 to about 70 nm are preferred, with diameters of about 3.5 to about 50 nm being more preferred. It is also preferable to have average aspect ratios greater than or equal to about 100 and more preferably greater than or equal to about 1000. Representative VGCF are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

VGCF are generally used in amounts greater than or equal to about 0.25 wt %, preferably greater or equal to about 0.5 wt %, more preferably greater than or equal to about 1 wt % of the total composition. VGCF are furthermore generally used in amounts less than or equal to about 30 wt %, preferably less than or equal to about 10 wt %, more preferably less than or equal to about 5 wt % of the total weight of the composition.

Carbon nanotubes produced by laser-evaporation of graphite or carbon arc synthesis may also be used. Nanotubes may consist of a single wall, wherein the tube diameter is about 0.7 to about 2.4 nm, or have multiple, concentrically-arranged walls wherein the tube diameter is from about 2 to about 50 nm. When carbon nanotubes are used it is preferred to have an average aspect ratio greater than or equal to about 5, preferably greater than or equal to about 100, more preferably greater than or equal to about 1000. Representative carbon nanotubes are described in U.S. Pat. No. 6,183,714 to Smalley et al., U.S. Pat. No. 5,591,312 to Smalley, U.S. Pat. No. 5,641,455 to Ebbesen et al., U.S. Pat. No. 5,830,326 to Iijima et al., U.S. Pat. No. 5,591,832 to Tanaka et al., and U.S. Pat. No. 5,919,429 to Tanaka et al.

Carbon nanotubes are generally used in amounts greater than or equal to about 0.025 wt %, preferably greater or equal to about 0.05 wt %, more preferably greater than or equal to about 0.1 wt % of the total composition. Carbon nanotubes are furthermore generally used in amounts less than or equal to about 30 wt %, preferably less than or equal to about 10 wt %, more preferably less than or equal to about 5 wt % of the total weight of the composition.

Carbon black may also be used. Preferred carbon blacks are those having average particle sizes less than about 200 nm, preferably less than about 100 nm, more preferably less than about 50 nm. Preferred conductive carbon blacks may also have surface areas greater than about 200 square meter per gram ($m^2/g$), preferably greater than about 400 $m^2/g$, yet more preferably greater than about 1000 $m^2/g$. Preferred conductive carbon blacks may have a pore volume (dibutyl phthalate absorption) greater than about 40 cubic centimeters per hundred grams ($cm^3/100$ g), preferably greater than about 100 $cm^3/100$ g, more preferably greater than about 150 $cm^3/100$ g. Exemplary carbon blacks include the carbon black commercially available from Columbian Chemicals under the trade name Conductex® the acetylene black available from Chevron Chemical, under the trade names S.C.F. (Super Conductive Furnace) and E.C.F. (Electric Conductive Furnace); the carbon blacks available from Cabot Corp. under the trade names Vulcan XC72 and Black Pearls; and the carbon blacks commercially available from Akzo Co. Ltd under the trade names Ketjen Black EC 300 and EC 600. Preferred conductive carbon blacks may be used in amounts from about 2 wt % to about 25 wt % based on the total weight of the composition.

Solid conductive metallic fillers may also be used in the conductive compositions. These may be electrically conductive metals or alloys that do not melt under conditions used in incorporating them into the thermoplastic resins, and fabricating finished articles therefrom. Metals such as aluminum, copper, magnesium, chromium, tin, nickel, silver, iron, titanium, and mixtures comprising any one of the foregoing metals can be incorporated. Physical mixtures and true alloys such as stainless steels, bronzes, and the like, can also serve as conductive filler particles. In addition, a few intermetallic chemical compounds such as borides, carbides, and the like, of these metals, (e.g., titanium diboride) can also serve as conductive filler particles. Solid non-metallic, conductive filler particles such as tin-oxide, indium tin oxide, and the like may also be added to render the thermoplastic resins conductive. The solid metallic and non-metallic conductive fillers may exist in the form of powder, drawn wires. strands, fibers, tubes, nanotubes, flakes, laminates, platelets, ellipsoids, discs, and other commercially available geometries.

Regardless of the exact size, shape and composition of said solid metallic and non-metallic conductive filler particles, they may be dispersed into the thermoplastic resins at loadings greater than or equal to about 1 wt %, preferably greater than or equal to about 1.5 wt % and more preferably greater than or equal to about 2 wt % of the total composition. The loadings of said solid metallic and non-metallic conductive filler particles may be less than or equal to 50 wt %, preferably less than or equal to about 45 wt %, more preferably less than or equal to about 40 wt % of the total composition.

Non-conductive, non-metallic fillers that have been coated over a substantial portion of their surface with a coherent layer of solid conductive metal may also be used in the conductive compositions. The non-conductive, non-metallic fillers are commonly referred to as substrates, and substrates coated with a layer of solid conductive metal may be referred to as "metal coated fillers". Typical conductive metals such as aluminum, copper, magnesium, chromium, tin, nickel, silver, iron, titanium, and mixtures comprising any one of the foregoing metals may be used to coat the substrates. Examples of substrates include those described in "Plastic Additives Handbook, $5^{th}$ Edition" Hans Zweifel, Ed, Carl Hanser Verlag Publishers, Munich, 2001. Non-limiting examples of such substrates include silica powder, such as fused silica and crystalline silica, boron-nitride powder, boron-silicate powders, alumina, magnesium oxide (or magnesia), wollastonite, including surface-treated wollastonite, calcium sulfate (as its anhydride, dehydrate or trihydrate), calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, and kaolin comprising various coatings to facilitate compatibility with the polymeric matrix resin, mica, feldspar, silicate spheres, flue dust, cenospheres, finite, aluminosilicate (armospheres), natural silica sand, quartz, quartzite, perlite, tripoli, diatomaceous earth, synthetic silica, and mixtures comprising any one of the foregoing. All of the above substrates may be coated with a layer of metallic material for use in the conductive compositions.

Other commonly used non-conductive mineral fillers such as silicon carbide, molybdenum sulfide, zinc sulfide, aluminum silicate (mullite), synthetic calcium silicate, zirconium silicate, barium titanate, barium ferrite, barium sulfate, and flaked fillers such as glass flakes, flaked silicon carbide, aluminum diboride, may also be used as substrates for conductive metallic coatings. Fibrous fillers such as aluminum silicates, aluminum oxides, magnesium oxides, and calcium sulfate hemihydrate may also be coated with conductive metallic coatings and used in the conductive compositions. Other fibrous fillers which may be used as substrates for conductive metallic coatings include natural fillers and reinforcements, such as wood flour obtained by pulverizing wood, and fibrous products such as cellulose, cotton, sisal, jute, starch, cork flour, lignin, ground nut shells, corn, rice grain husks, and the like. Also included among fibrous fillers that can be used as substrates for conductive metallic coatings are single crystal fibers or "whiskers" including silicon carbide, alumina, boron carbide, and mixtures comprising any one of the foregoing. Class fibers, including textile glass fibers such as E, A, C, ECR, R, S, D, and NE glasses and quartz, and the like, may also be coated with a conductive metallic coating and used in the conductive composition.

Organic reinforcing fibrous fillers which can be used as substrates for conductive metallic coatings include fibers obtained from organic polymers such as poly(ether ketone), polyetherimide, polybenzoxazole, poly(phenylene sulfide), polyesters, polyethylene, aromatic polyamides, aromatic polyetherimides or polyetherimides, polytetrafluoroethylene, acrylic resins, poly(vinyl alcohol), and other polymers. Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures that can be used as substrates include glass fiber-carbon fiber, carbon fiber-aromatic polyetherimide (aramid) fiber, and aromatic polyetherimide fiberglass fiber. Fibrous fillers to be used as substrates for conductive metallic coatings may be supplied in the form of, for example, rovings, woven fibrous reinforcements, such as 0–90 degree fabrics, non-woven fibrous reinforcements such as continuous strand mat, chopped strand mat, tissues, papers and felts and 3-dimensional woven reinforcements, preforms, braids, and mixtures comprising any one of the foregoing.

Regardless of the exact size, shape and composition of said substrates, they are coated with a solid layer of conductive metal covering from about 5% of the surface area to 100% of the surface area. The surface area is typically determined by commonly known methods such as BET nitrogen adsorption or mercury porosimetry. The metal coated fillers may be dispersed through the thermoplastic resins at loadings greater than or equal to about 1 wt %, preferably greater than or equal to about 1.5 wt % and more preferably greater than or equal to about 2 wt % of the total composition. The loadings of said solid metallic and non-metallic conductive fillers particles may be less than or equal to about 50 wt %, preferably less than or equal to about 45 wt %, more preferably less than or equal to about 40 wt % of the total composition.

In one embodiment carbon fibers, VGCF, carbon nanotubes, carbon black, conductive metal fillers, conductive non-metal fillers, metal coated substrates as detailed above, or any combination of the foregoing may be used in the thermoplastic resins to render the composition electrostatically dissipative. The preferred electrically conductive filler is carbon fiber. It is generally desirable to use the conductive fillers in amounts suitable to produce surface resistivity less than or equal to about $10^9$, preferably less than or equal to about $10^7$, more preferably less than or equal to about $10^6$ and most preferably less than or equal to about $10^5$ ohm/sq as measured as per ASTM D257. It is also desirable to have the volume resistivity less than or equal to about 1000, preferably less than or equal to about 100, more preferably less than or equal to about 50, most preferably less than or equal to about 10 ohm/sq.

The conductive compositions may further contain impact modifiers. Suitable impact modifiers include natural and synthetic elastomeric polymers, typically derived from such monomers as olefins (e.g., ethylene, propylene, 1-butene and 4-methyl-1-pentene), alkenylaromatic monomers (e.g., styrene and α-methylstyrene), conjugated dienes (e.g., butadiene, isoprene and chloroprene), and vinylic carboxylic acids and their derivatives (e.g., vinyl acetate, acrylic acid, alkylacrylic acids, ethyl acrylate, methyl methacrylate and acrylonitrile). They include homopolymers and random, block, radial block, graft and core-shell copolymers as well as combinations thereof.

A particularly useful class of impact modifiers comprises the AB (diblock) and ABA (triblock) copolymers and core-shell graft copolymers of alkenylaromatic and diene compounds, especially those comprising styrene and either butadiene or isoprene blocks. The conjugated diene blocks may be partially or entirely hydrogenated, whereupon they may be represented as ethylene-propylene blocks and the like and have properties similar to those of olefin block copolymers. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methylstyrene)-polybutadiene-poly(α-methylstyrene) and poly(α-methylstyrene)-polyisoprene-poly(α-methylstyrene). Particularly preferred triblock copolymers are available commercially as Cariflex®, Kraton D®, and Kraton G® from Shell.

Also suitable as impact modifiers are core-shell type graft copolymers and ionomer resins, which may be wholly or partially neutralized with metal ions. In general, the core-shell type graft copolymers have a predominantly conjugated diene or crosslinked acrylate rubbery core and one or more shells polymerized thereon and derived from monoalkenylaromatic and/or acrylic monomers alone or in combination with other vinyl monomers. Other impact modifiers include the above-described types containing units having polar groups or active functional groups, as well as miscellaneous polymers such as Thiokol rubber polysulfide rubber, polyurethane rubber, polyether rubber (e.g., polypropylene oxide), epichlorohydrin rubber, ethylene-propylene rubber, thermoplastic polyester elastomers, thermoplastic ether-ester elastomers, and the like, as well as mixtures comprising any one of the foregoing. Specially preferred amongst the ionomer resins is Surlyn® available from Du Pont.

Impact modifiers may be used in amounts greater than or equal to about 0.5, preferably greater than or equal to about 1.0, more preferably greater than or equal to about 1.5 wt % based upon the total weight of the composition. In general it is desirable to have the impact modifier present in an amount of less than or equal to about 20, preferably less than or equal to about 15, more preferably less than or equal to about 10 wt % of the total weight of the composition.

Other additives such as antioxidants, flame retardants, anti-drip agents, antiozonants, stabilizers, anti-corrosion additives, mold release agents, fillers, anti-static agents, flow promoters, pigments, dyes, and the like, commonly used in thermoplastic compositions may also be added in the amounts desired.

In processing the conductive thermoplastic compositions, powdered polyetherimide and polyester resins along with the impact modifier may first be dry blended with or without the electrically conductive filler in a high speed mixer such as a Henschel or a Waring blender and then fed into equipment where it is further melt blended. Examples of suitable melt blending equipment may be, but not limited to, extruders, roll mills, Buss kneaders, Helicones, and the like. If the electrically conductive filler is not added to the resins during the dry blending process they may be fed into the melt blending process later. It is also possible for the resins to be fed sequentially to melt blending equipment and the electrically conductive filler added later either directly or in the form of a masterbatch. It is preferable to use a twin-screw extruder or a Buss kneader to melt blend the thermoplastic resins along with the impact modifier and the electrically conductive filler. After melt blending, the conductive thermoplastic composition is quenched and pelletized for further processing by other finishing processes such as injection molding, blow molding, vacuum forming, and the like.

In a preferred embodiment, in one manner of proceeding, a high molecular weight polyetherimide is fed directly into the throat of a twin-screw extruder along with polyethylene terephthalate. Impact modifier along with the antioxidant and mold release agent is also fed into the twin-screw extruder at the throat through a hopper. Carbon fibers in the requisite quantity are also fed into the twin-screw extruder through a side feeder. The temperature of the extruder is set at a temperature sufficient to melt the polyetherimide and polyester resins. The extruder is subjected to a low vacuum in order to remove any vapors present. The strand of conductive resin emerging from the extruder is quenched and pelletized. It can be subsequently injection molded into a finished article.

As stated above the conductive thermoplastic resins may be used in a variety of applications where quick assembly is desired such as in electronics, computers, automobiles, and the like. Their ability to heat rapidly in an electromagnetic field allows them to be quickly remolded or reshaped outside of a manufacturing environment. Furthermore, the use of microwave heating permits localized surface heating. Thus, surface of molded parts of this invention may be rapidly heated and fused together without heating the bulk of the molded parts.

The invention is further illustrated by the following non-limiting example.

Polyetherimide was blended with polyethylene terephthalate in compositions 2 to 7 as shown in Table 1 where the content for all components is indicated in parts by weight. Composition 1, which does not contain any polyetherimide, was used as the control. The polyetherimide (Ultem 1010 from General Electric Co.) together with the polyethylene terephthalate resin (Crystar 3947 from DuPont), impact modifier (Surlyn 8940 from Du Pont), carbon fibers, antioxidant 1076, sodium stearate, EE concentrate comprising 25 wt % epoxy novolac and 75 wt % ethylene ethyl acrylate with 18wt % ethyl acrylate available from RTP Company and mold release agents were fed into the throat of a Werner and Pfleiderer 30 mm twin screw extruder having 10 barrels (heating zones). Zone temperatures were adjusted to be 200° C., 220° C., 240° C., 260° C., 260° C., 260° C., 260° C., 260° C., 260° C. and 260° C. Die temperature was maintained at 260° C. Carbon fibers were fed through a side feeder at barrel # 7. Extruder speed was set at 400 rpm. A vacuum of 25 mm of Hg was applied to the extruder barrel throughout the experiment. The pellets obtained were dried and injection molded into samples on a 120 ton VanDorn injection molding machine.

TABLE 1

|  | Component | | | | | | |
|---|---|---|---|---|---|---|---|
|  | 1 | 2 | 3 | 4 | 5 | 6 | 7 |
| PET | 80 | 72 | 68 | 64 | 60 | 56 | 48 |
| Carbon Fiber | 20 | 20 | 20 | 20 | 20 | 20 | 20 |
| Antioxidant 1076 | 0.13 | 0.13 | 0.13 | 0.13 | 0.13 | 0.13 | 0.13 |
| Sodium Stearate | 0.275 | 0.275 | 0.275 | 0.275 | 0.275 | 0.275 | 0.275 |
| PETS mold release | 0.2 | 0.2 | 0.2 | 0.2 | 0.2 | 0.2 | 0.2 |
| SURLYN 8940 | 1.8 | 1.8 | 1.8 | 1.8 | 1.8 | 1.8 | 1.8 |
| EE Concentrate | 1 | 1 | 1 | 1 | 1 | 1 | 1 |
| Ultem PEI 1010 | 0 | 8 | 12 | 16 | 20 | 24 | 32 |
| Total Parts by weight | 103.405 | 103.405 | 103.405 | 103.405 | 103.405 | 103.405 | 103.405 |
| Notched Izod (ft lb/in) | 0.728 | 0.834 | 0.865 | 0.807 | 0.834 | 0.831 | 0.779 |
| Dynatup Impact (ft lb) | — | 4.83 | 4.28 | 4.28 | 4.1 | 4.37 | 4.37 |
| Surface Resistivity (ohm/sq) | $10^5$ | $10^5$ | $10^5$ | $10^5$ | $10^5$ | $10^5$ | $10^5$ |
| Volume Resitivity (ohm-cm) | 2.3 | 7.3 | 5.3 | 5.4 | 5.8 | 4.9 | 3.6 |
| Glass Transition Temperature (° C.) | 80 | 96.4 | 99.5 | 110.8 | 109.8 | 116.7 | 124.0 |

The injection-molded samples were subjected to testing as shown in table 1. Notched izod impact tests conducted at 23° C. as per ASTM D256. Impact properties were also measured using a Dynatup testing machine, where injection molded samples having a 4" diameter and ⅛" thickness were subjected to impact with a 50.5 lbs at 7.5 miles per hour (mph).

Surface and volume resistivity were measured as per ASTMD257. Surface resistivity was measured by placing two electrodes on the surface of the test sample (4" in diameter), applying a potential difference between them and measuring the resulting current. In order to measure the volume resistivity, the surface of the ASTM Type I dogbone tensile specimens was scored 2.5 inches apart using a sharp blade to create stress concentrators. The samples were then fractured under liquid nitrogen at these points, and the fractured surface was then coated with conductive silver paint. When the silver paint dried, volume resistivity measurements were made using a standard voltmeter.

The glass transition temperature was also measured using a dynamic mechanical analyzer (DMA) Model 983 from TA Instruments. All DMA measurements were made at a frequency of 1 Hz and at a temperature rate of 3° C./minute.

From Table 1 it can be seen that as the amount of polyetherimide in the polyester is increased, most properties remain fairly stable. The impact properties as determined by the notched Izod and the Dynatup impact tests show fairly consistent values, as do the electrical properties as determined by the volume and surface resistivity. Only the glass transition temperature, which determines dimensional stability, increases with the polyetherimide content in the material, which is desirable for certain applications. Thus it is possible to increase the dimensional stability of the thermoplastic composition while maintaining mechanical properties such as impact as well as the electrical conductivity of the composition.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

I claim:

1. An electrically conductive thermoplastic composition comprises:

a polyetherimide resin;

a polyester resin;

and an electrically conductive filler consisting essentially of carbon fibers, vapor grown carbon fibers, carbon nanotubes, conductive metal fillers, conductive non-metal fillers, metal coated substrates, or mixtures comprising at least one of the foregoing electrically conductive fillers.

2. The composition of claim 1, wherein the polytherimide resin comprises structural units of the formula (I)

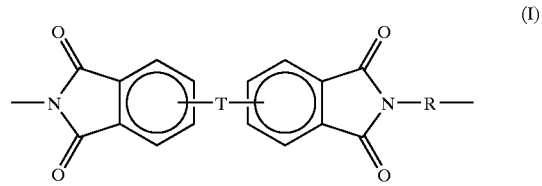

(I)

wherein T is —O— or a group of the formula —O—Z—O—, and wherein the divalent bonds of the —O— or the —O—Z—O— group are in the 3,3', 3,4', 4,3', or the 4,4' positions, and wherein T comprises the divalent radicals of formula (II)

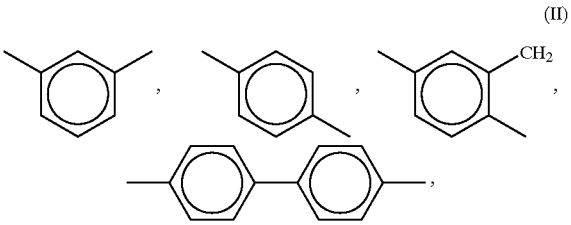

(II)

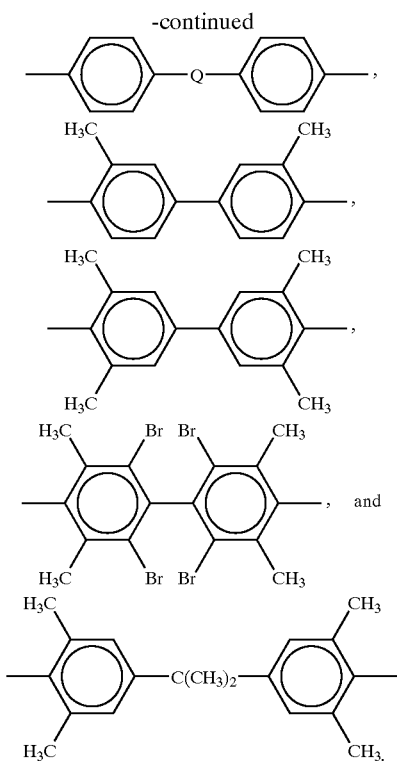

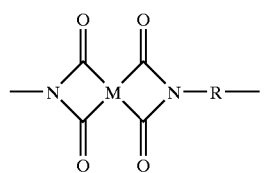

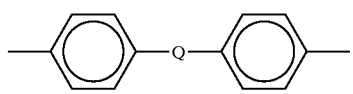

and wherein Q is a divalent moiety selected from the group consisting of —O—, —S—, —C(O)—, —SO$_2$—, —SO—, —C$_y$H$_{2y}$—, and halogenated derivatives thereof, or a group of the formula —O—Z—O— wherein the divalent bonds of the —O— or the —O—Z—O— group are in the 3,3', 3,4', 4,3', or the 4,4' positions, and wherein Z includes the divalent radicals of formula (II).

3. The composition of claim 1, wherein the polyetherimide resin is a copolymer comprising polyimide structural units of the formula (IV)

$$\text{(IV)}$$

(structure shown)

wherein R is a substituted or unsubstituted divalent organic radical selected from the group consisting of aromatic hydrocarbon radicals having about 6 to about 20 carbon atoms and halogenated derivatives thereof, straight or branched chain alkylene radicals having about 2 to about 20 carbon atoms, cycloalkylene radicals having about 3 to about 20 carbon atoms, or divalent radicals of the general formula (V)

$$\text{(V)}$$

(structure shown)

wherein Q is a divalent moiety selected from the group consisting of —O—, —S—, —C(O)—, —SO$_2$—, —SO—, —C$_y$H$_{2y}$—, and halogenated derivatives thereof, including perflfluoroalkylene groups and wherein M is a radical of formula (VI)

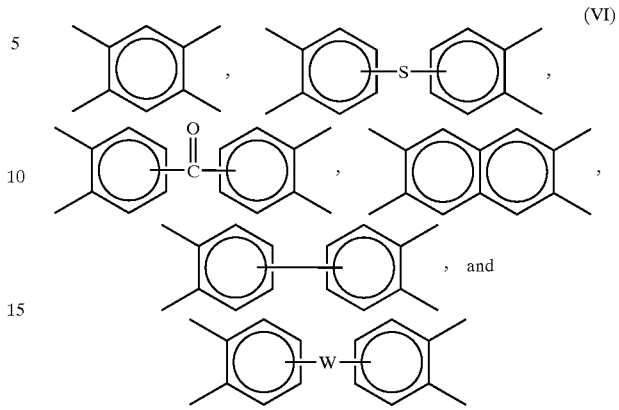

wherein W is a divalent moiety selected from the group consisting of —O—, —S—, —C(O)—, —SO$_2$—, —SO—, —C$_y$H$_{2y}$—, and halogenated derivatives thereof.

4. The composition of claim 1, wherein the polyetherimide resin is derived from the reaction of 2,2-bis[4-3,4-dicarboxyphenoxy)phenyl]propane dianhydride, 4,4'-bis(3, 4_dicarboxyphenoxy)diphenyl ether dianhydride, 4,4'-bis (3,4-dicarboxyphenoxy)diphenyl sulfide dianhydride, 4,4'-bis(3 4_dicarboxyphenoxy)benzophenone dianhydride, 4,4'-bis(3,4-dicarboxyphenoxy)diphenyl sulfone dianhydride, 2,2-bis[4-(2,3-dicarboxyphenoxy)phenyl] propane dianhydride, 4,4'-bis(2,3-dicarboxyphenoxy) diphenyl ether dianhydride, 4,4'-bis(2,3-dicarboxyphenoxy) diphenyl sulfide dianhydride, 4,4'-bis(2,3-dicarboxyphenoxy)benzophenone dianhydride, 4,4'-bis(2,3-dicarboxyphenoxy)diphenyl sulfone dianhydride, 4-(2,3-dicarboxyphenoxy)-4'-(3,4-dicarboxyphenoxy)diphenyl-2, 2-propane dianhydride, 4-(2,3-dicarboxyphenoxy)-4'-(3,4-dicarboxyphenoxy)diphenyl ether dianhydride, 4-(2,3-dicarboxyphenoxy)-4'-(3,4-dicarboxyphenoxy)diphenyl sulfide dianhydride, 4-(2,3-dicarboxyphenoxy)-4'-(3,4-dicarboxyphenoxy)benzophenone dianhydride, 4-(2,3-dicarboxyphenoxy)-4'-(3,4-dicarboxyphenoxy)diphenyl sulfone dianhydride, fluorinated aromatic dianhydrides, pyromellitic dianhydride, oxydiphthalic anhydride, bisphenol-A dianhydride, or mixtures thereof, with ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl)methane, bis(2-chloro-4-amino-3,5- diethylphenyl)methane, bis(4-aminophenyl)propane, 2,4-bis (b-amino-t-butyl)toluene, bis(p-b-amino-t-butylphenyl) ether, bis(p-b-methyl-o-aminophenyl)benzene, bis(p-b-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis (3-aminopropyl)tetramethyidisiloxane, or mixtures thereof.

5. The polyester resin of claim 1, comprising structural units of the formula (XI):

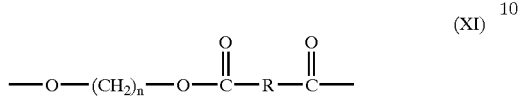

(XI)

wherein n is an integer ranging from about 2 to about 6 and R is a $C_6-C_{20}$ aryl radical.

6. The polyester resin of claim 1, wherein the polyester resin is poly(ethylene terephthalate), poly(1,4-butylene terephthalate), and poly(propylene terephthalate).

7. The composition of claim 1, wherein the polyetherimide resin comprises about 1 to about 90 wt % and the polyester resin comprises about 1 to about 90 wt % based on the total weight of the composition.

8. The composition of claim 1, wherein the polyetherimide resin comprises about 5 to about 80 wt % and the polyester resin comprises about 5 to about 85 wt % based on the total weight of the composition.

9. The composition of claim 1, wherein the polyetherimide resin comprises about 10 to about 60 wt % and the polyester resin comprises about 10 to about 80 wt % based on the total weight of the composition.

10. The composition of claim 1, wherein the carbon fibers comprise about 2 wt % to about 40 wt % of the total composition.

11. The composition of claim 1, wherein the carbon fibers comprise about 4 wt % to about 25 wt % of the total composition.

12. The composition of claim 1, wherein the carbon fibers comprise about 6 wt % to about 20 wt % of the total composition.

13. The composition of claim 1, wherein vapor grown carbon fibers comprise about 0.25 wt % to about 30 wt % of the total composition.

14. The composition of claim 1, wherein carbon nanotubes comprise about 0.25 wt % to about 30 wt % of the total composition.

15. The composition of claim 1, wherein the conductive metal filler comprises about 1 wt % to about 40 wt % of the total composition.

16. The composition of claim 1, wherein the conductive non-metallic filler comprises about 1 wt % to about 50 wt % of the total composition.

17. The composition of claim 1, wherein the metal coated substrate filler comprises about 1 wt % to about 40 wt % of the total composition.

18. The composition of claim 1, further comprising an impact modifier.

19. The composition of claim 18, wherein the impact modifier is a diblock copolymer, a triblock copolymer or an ionomer comprising about 0.5 to about 20 wt % based on the total weight of the composition.

20. A conductive thermoplastic composition comprising:
a polyetherimide resin;
a polyester resin;
an electrically conductive carbon fiber; and
an impact modifier.

21. The composition of claim 20, wherein the polyetherimide comprises about 10 to about 40 wt % and the polyester resin comprises about 30 to about 80 wt % based on the total weight of the composition.

22. The composition of claim 20, wherein the polyester resin comprises poly(ethylene terephthalate).

23. The composition of claim 20, wherein the electrically conductive carbon fiber is chopped and has an initial length of about 0.1 inch to about 2.0 inches and a diameter ranging from greater than or equal to about 3 microns to less than or equal about 10 microns.

24. An extruded conductive pellet formed from a composition comprising:
a thermoplastic blend of a polyetherimide resin and a polyester resin; and
an electrically conductive filler; wherein the electrically conductive filler is carbon fibers, vapor grown carbon fibers, carbon nanotubes, conductive metal fillers, conductive non-metal fillers, metal coated substrates, or mixtures comprising at least one of the foregoing electrically conductive fillers.

25. The composition of claim 24, further comprising impact modifiers, antioxidants, mold release agents, antiozonants, stabilizers, dyes, and the like.

26. An article manufactured from a composition comprises:
a polyetherimide resin;
a polyester resin; and
a conductive carbon fiber, wherein the composition can be heated electromagnetically.

27. The composition of claim 26, further comprising impact modifiers, antioxidants, mold release agents, antiozonants, stabilizers, dyes, and the like.

28. A method for manufacturing a conductive composition comprising:
compounding a polyetherimide, a polyester resin, carbon fibers, and an impact modifier in an extruder;
quenching and pelletizing the extrudate; and
injection molding said pellitized extrudate into an article.

* * * * *